United States Patent
Pitner

[11] 3,878,695
[45] Apr. 22, 1975

[54] ASSEMBLY OF A YOKE OF A UNIVERSAL JOINT WITH A SHAFT

[75] Inventor: Alfred Pitner, Paris, France

[73] Assignee: Nadella, Rueil-Malmaison, France; a part interest

[22] Filed: Jan. 5, 1973

[21] Appl. No.: 321,360

[30] Foreign Application Priority Data
Jan. 11, 1972 France............................. 72.00813

[52] U.S. Cl................. 64/11 R; 64/1 V; 64/17 R; 64/175 P; 64/27 NM
[51] Int. Cl............................................. F16d 3/28
[58] Field of Search... 64/17 R, 17 SP, 1 V, 27 NM, 64/11 R, 23, 27 R

[56] References Cited
UNITED STATES PATENTS

| | | | |
|---|---|---|---|
| 1,121,144 | 12/1914 | Sponsel | 64/17 R |
| 1,892,037 | 12/1932 | Crews | 64/11 |
| 2,174,223 | 9/1939 | Fraventhal et al. | 64/11 R |
| 2,394,405 | 2/1946 | Schjolin | 64/1 V |
| 2,691,283 | 10/1954 | Stover | 64/27 NM |

FOREIGN PATENTS OR APPLICATIONS

| | | | |
|---|---|---|---|
| 480,118 | 4/1953 | Italy | 64/17 R |
| 798,315 | 3/1936 | France | 64/27 NM |
| 720,404 | 12/1954 | United Kingdom | 64/11 R |
| 554,139 | 1957 | Belgium | 64/11 R |

Primary Examiner—Samuel Scott
Assistant Examiner—Randall Heald
Attorney, Agent, or Firm—Robert E. Burns; Emmanuel J. Lobato; Bruce L. Adams

[57] ABSTRACT

Assembly between a shaft and a universal joint yoke. The yoke comprises a tubular element having one end portion so shaped as to define two yoke branches for mounting a cross member of the joint and recessed portions for accommodating angular movements of the joint. The opposite end portion of the tubular element constitutes a collar. A sleeve of elastomeric material surrounds the shaft and is radially compressed between the collar and the shaft.

25 Claims, 11 Drawing Figures

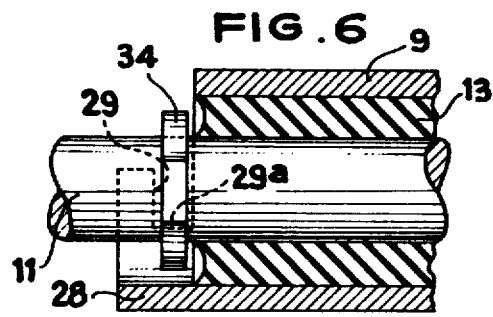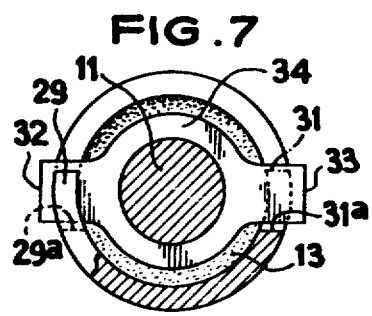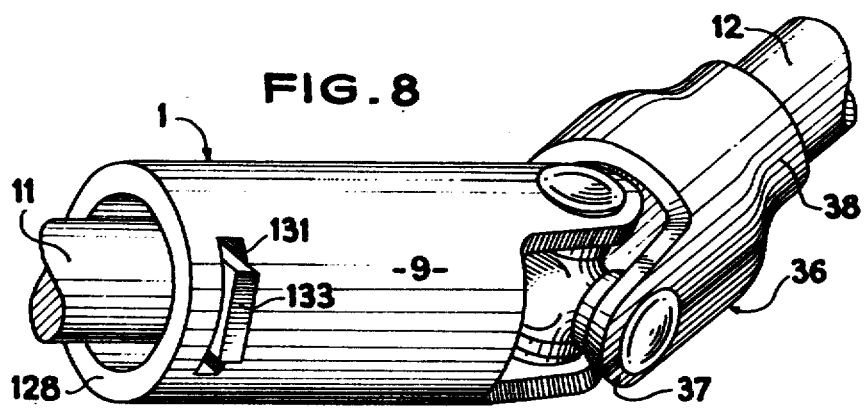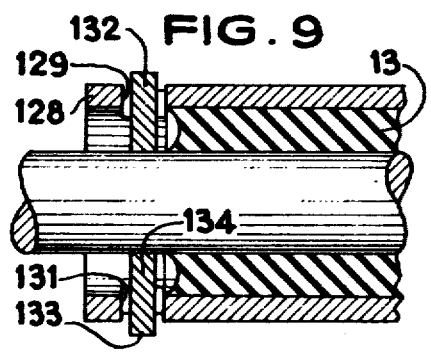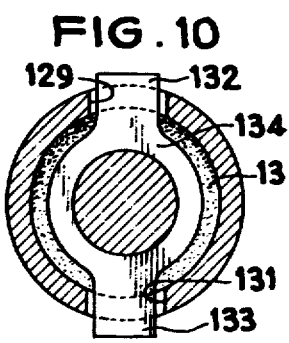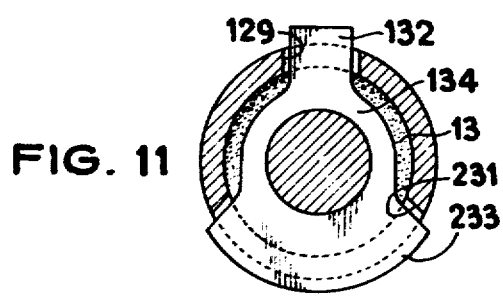

3,878,695

1

ASSEMBLY OF A YOKE OF A UNIVERSAL JOINT WITH A SHAFT

The present invention relates to yokes for a universal joint.

U.S. Pat. No. 1,812,934 teaches making a universal joint yoke from a cylindrical tubular element by forming one of the end portions of the element so as to define the two branches of the yoke, and cutting away portions for accommodating movements of the cross member, the other end portion of the tubular element constituting a collar.

An object of the invention is to provide, in starting with said known arrangement, an assembly between the end portion of the tubular element constituting a collar and the shaft or any other motion transmitting means under conditions with ensure by simple and cheap means a damping or absorption of the vibrations between the shaft and the yoke and consequently between the shaft and the other shaft normally connected to the associated yoke of the universal joint.

The invention provides an assembly of a shaft or other motion transmitting means with the collar of a universal joint yoke, wherein the yoke comprises a tubular element one of the end portions of which element is shaped in such manner as to define two branches for mounting a cross member and cut-away portions for accommodating movements, the other end portion of the tubular element constituting a collar and the shaft is engaged inside a sleeve of an elastomeric material which is radially compressed in contact with the wall of said end portion constituting the collar.

When such an assembly is employed in a universal joint in a steering column, increased comfort is afforded to the driver since the vibrations produced by the vehicle wheels rolling along the road are markedly attenuated by the elastomeric sleeve interconnecting the yoke and the motion transmitting shaft.

The sleeve may be disposed concentrically with a collar and shaft having a circular cross-sectional shape, but in this case it will be necessary, in order to preclude any relative sliding, to provide an additional connection by the bonding or vulcanization of the sleeve of elastommeric material to the collar.

It may be advantageous to give the collar the shape of a cylinder the base of which is any closed curved, for example an ellipse or such shape that the elastomeric sleeve can have portions which project or are set back so as to positively engage the collar.

Irrespective of the shape of the tubular element constituting the collar, this element may be obtained from a tube which is rolled or drawn which has a longitudinal weld, or from sheet metal which is blanked, rolled and then welded. It is also possible to form the tubular element by welding two cylindrical half-shells of sheet metal which are put into shape and welded together. In the latter case it is preferable to carry out, before welding, the shaping of the element which defines the branches and the cut-away portions for accommodating the movements of the joint.

For safety reasons and in order to preclude fracture of the weld, it may be desirable to dispose one or more rings or hoops around the part of the yoke constituting the collar.

With a tubular collar of the type described, it is possible to place in position in the sleeve a shaft end which has a non-circular shape, for example a triangular shape or a flatsided shape, the flexible material of the sleeve the fitting itself to the particular shape of the shaft. In this arrangement, the radial compression of the elastomeric ring is not constant.

Another object of the invention is to provide a universal joint in which the two yokes are assembled with the corresponding shafts in the manner described hereinbefore.

In order to increase safety in use of a universal joint according to the invention, it is specifically arranged that the shaft be provided with at least one radial lug or key engaged in an opening in the tubular element constituting a collar, and that, with respect to the circumferential end or ends of this opening, the lug has or the lugs have such play that this lug remains or these lugs remain out of contact with said end or said ends in normal operation but come in contact therewith when the elastomeric material of the sleeve is deformed beyond a predetermined limit.

Several embodiments of the invention will now be described by way of examples with reference to the accompanying drawings in which:

FIGS. 6 and 7 are respectively an axial sectional view and a cross-sectional view of a tubular yoke having an elastically yieldable sleeve and including a double key safety device;

FIG. 8 is a perspective view of a universal joint one of the yokes of which is tubular and comprises a single key safety device;

FIGS. 9 and 10 are views similar to FIGS. 6 and 7 of a modification of the double key safety device, and FIG. 11 is a cross-sectional view of a tubular yoke representing a double key washer which may be placed in position by lateral insertion thereof.

Figure 1:
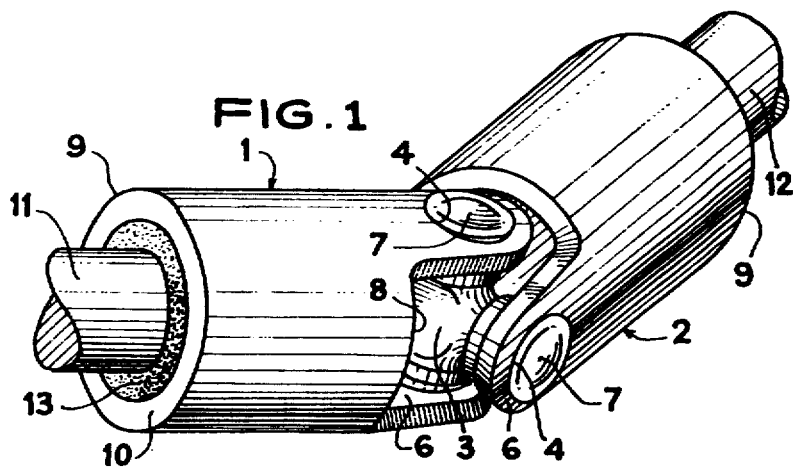
FIG. 1 is a perspective view of a universal joint each of the yokes of which is connected to a shaft.

The universal joint shown in FIG. 1 comprises two yokes, 1, 2 each of which is obtained from a tubular element, these yokes being interconnected by means of a cross member 3 the trunnions of which are mounted in bores 4 in the branches 6 of the corresponding yoke with interposition of needle bearing cups.

The yoke branches are formed by the shaping of a corresponding end portion of the tubular element which forms between the branches notches or cut-away portions 8 which accommodate the movements of the universal joint.

The other end of the tubular element constitutes a collar 9 for the assembly of a motion-transmitting shaft 11 or 12.

Figure 2:
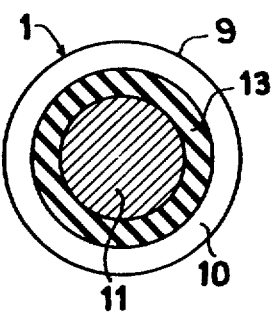
FIG. 2 is a cross-sectional view of one of the yokes of the joint shown in FIG. 1.

In FIGS. 1 and 2, the shaft 11 and the tubular collar 9 have a circular cross-sectional shape and the interconnection between the shaft and the yoke 1 is achieved by means of a elastomeric sleeve 13 which is coaxial with the shaft 11 and the yoke 1 and engaged in the collar 9, the shaft 11 being mounted in the sleeve 13.

The cross section in the free state of the sleeve 13 is greater than the section of the annular space between the shaft 11 and the collar 9 so that mounting the shaft 11 inside the sleeve 13 radially compresses the latter and interconnects the two parts as concerns rotation.

The connection between the shaft and the yoke can be reinforced by a bonding or vulcanization of the outer surface of the sleeve 13 to the inner surface of the collar 9.

Figure 3:
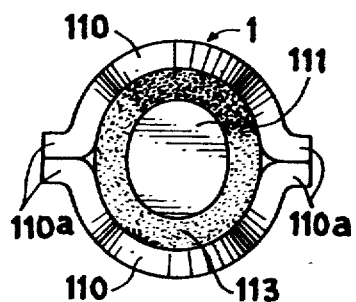
FIGS. 3 and 4 are cross-sectional views of other embodiments of one of the yokes shown in FIG. 1.

Whereas in FIGS. 1 and 2 the tubular element from which the yoke 1 is obtained is formed from a tube 10 which is rolled or drawn, the tubular element shown in FIG. 3 results from the assembly of two half-shells 110 having a generally semi-cylindrical shape and welded to each other along their diametral edges 110$^a$. Further, the cross-sectional shape of the two half-shells 110 is such that the tubular element formed by the assembly of these half-shells has an internal section having an elliptical shape, the shaft 111 having a corresponding elliptical section which the sleeve 113 of course also has.

The elliptical shape adopted in the arrangement shown in FIG. 3 achieves an interconnection between the shaft and the yoke 1 which is more reliable than the arrangement shown in FIGS. 1 and 2.

Figure 4:
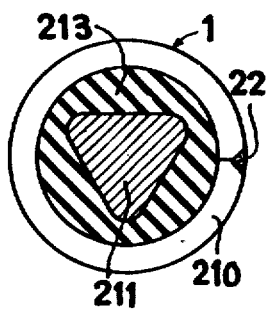

In the embodiment shown in FIG. 4, the tubular element 1 is obtained from a tube 210 produced by a rolling operation and a welding of its adjoining edges at 22. The shaft 211 has a triangular shape to which the shape of the bore of the sleeve 213 is adapted, this sleeve being, in the free state, of circular shape as in the case shown in FIGS. 1–3. It will be clear that the radial compression of the sleeve 213 shown in FIG. 4 is not uniform.

Figure 5:
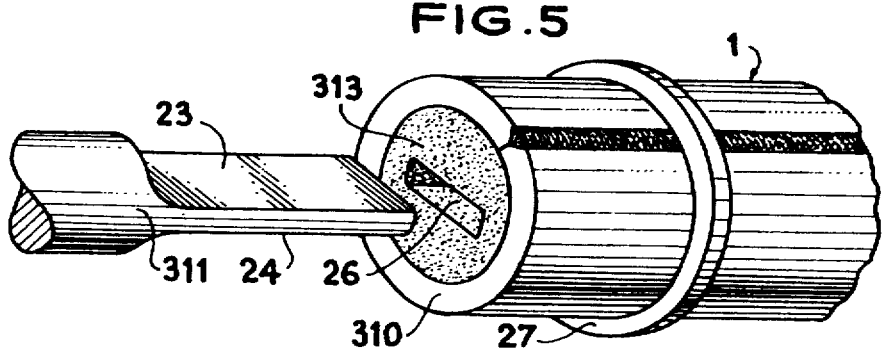
FIG. 5 is a partial perspective view of another embodiment of one of the yokes and of the corresponding shaft end.

The tubular element 1 shown in FIG. 5 is also obtained from a tube 310 which is rolled and welded. The section of the end portion of the shaft 311 engaged in the sleeve 313 is however different from that shown in FIG. 4 since it has two parallel flat surfaces 23, 24, the sleeve 313 having in a corresponding manner a centre aperture of rectangular shape 26 for inserting the flat end portion of the shaft 311.

A circular hoop or ring 27 surrounds the tubular element shown in FIG. 5 in order to improve operational safety.

In accordance with the teaching of French Pat. No. 1,515,051 the needle bearing cups 7 placed over the corresponding trunnions are fixed in bores formed directly in the thickness of the yoke branches 6.

In the arrangement shown in FIG. 6, the tubular element 9 constituting a collar has adjacent the end opposed to the cross member an extension portion 28 having a semi-cylindrical shape at the respective circumferential ends of which are formed two circumferential notches 29, 31 which are diametrally opposed and face in opposite directions. Respectively engaged in these notches or keepers are radial lugs 32, 33 which are formed in diametrally opposed relation on a washer 34 which is fixed for example by a tight fit on the shaft 11. These two lugs or keys define a clearance with the edges and the ends 29$^a$ or 31$^a$ of the notches so that, in normal operation, they remain out of contact with the end of the notches. However, they are capable of coming in contact with this end when the elastomer of the sleeve 13 undergoes a deformation to an extent greater than a predetermined value due to deterioration of the elastomer or to an excessive force which would be liable to deteriorate the elastomer. The abutment of the lugs with the end of the notches ensures that the drive between the shaft and the universal joint yoke is maintained so that this arrangement performs a safety function.

The shaft 11 may of course be fitted through a centre aperture in the washer 34 after the latter has been positioned in the notches 29, 31.

In the embodiment shown in FIG. 8, the yoke shown in FIG. 1 formed in a tubular element 2 is replaced by a yoke 36 having concave branches 37 and a collar 38 of reduced diameter fixed directly on the shaft 12 in accordance with the teaching of the French Pat. No. 1,515,051. The yoke 1 is, as shown in FIG. 1, formed from a tubular element 9 whose end portion constitutes a cylindrical extension 128 in which is formed a single circumferential extending opening 131, constituting a keeper, through which extends a single lug or key 133 provided on a washer made fast with the shaft 11. The assembly constituted by the lug 133 and the opening 131 has a safety function as in the arrangement shown in FIGS. 6 and 7, owing to play between the two circumferential ends of these elements which is taken up in the case of excessive deformation of the elastomer interposed between the tubular element 9 and the shaft 11.

In the embodiment shown in FIGS. 9 and 10, the extension 128 of the tubular element 9 has two openings 129, 131 and a washer 134 is provided with two corresponding radial lugs 132, 133.

The washer 134 shown in FIGS. 8, 9 and 10 may first be placed in position in the tubular element 9 in the same way as the trunnions of the cross member 3 are engaged in the bores of the yoke branches, that is, by inserting the single lug or one of the lugs of the washer 134, which is presented obliquely, in the corresponding opening of the tubular element 9 and then tilting the washer which may be followed by the insertion of the other lug, if provided, in the other opening. The shaft is then fitted in the washer.

FIG. 11 shows an arrangement in which the washer 134 may be inserted laterally in the tubular element 9. For this purpose, one of the openings 231 hs an opening whose length transversely of the tubular element exceeds the diameter of the circular portion of the washer, the corresponding lug 233 correspondingly extending over a wide arc.

Having now described my invention what I claim as new and desire to secure by Letters Patent is:

1. An assembly comprising a rotary motion transmitting shaft; a universal joint yoke; the yoke comprising a tubular element having one end portion so shaped as to define two branches of the yoke for mounting a cross member of the joint and recessed portions for accommodating angular movements of the joint, the tubular element having an opposite end portion which constitutes a collar, the motion transmitting shaft having an end portion disposed within the collar and a portion extending beyond the collar in a direction away from the yoke branches; and means for elastically interconnecting the shaft and the collar for transmission of a given torque while precluding direct contact between the shaft and the yoke when transmitting said given torque, said means consisting of a sleeve of elastomeric material surrounding the motion transmitting shaft and radially compressed between and in direct contact with the collar and said end portion of the motion transmitting shaft.

2. An assembly as claimed in claim 1, wherein the cross section of the tubular element has the shape of a closed curve.

3. An assembly as claimed in claim 1, wherein the tubular element and the shaft each have an elliptical cross-sectional shape.

4. An assembly as claimed in claim 1, wherein the tubular element has a circular cross-sectional shape.

5. An assembly as claimed in claim 1, wherein the cross section of the end portion of the tubular element constituting the collar has a region which is set back to which the elastomeric sleeve conforms so as to create a positive interconnection between the motion transmitting shaft and the collar.

6. An assembly as claimed in claim 1, wherein the tubular element is a rolled tube.

7. An assembly as claimed in claim 1, wherein the tubular element is a drawn tube.

8. An assembly as claimed in claim 1, wherein the tubular element has a longitudinal weld.

9. An assembly as claimed in claim 1, wherein the cylindrical tubular element consists of a sheet of metal having two edges and a weld interconnecting the edges.

10. An assembly as claimed in claim 1, wherein the cylindrical tubular element comprises two half-shells of sheet metal which is blanked and pressformed, the half-shells having outer radially extending flanges which define an inner recess in the tubular element and are welded together.

11. An assembly as claimed in claim 9, wherein a support ring surrounds the outer surface of the end portion of the tubular element which constitutes a collar and surrounds the sleeve and the motion transmitting shaft.

12. An assembly as claimed in claim 10, wherein a support ring surrounds the outer surface of the end portion of the tubular element which constitutes a collar and surrounds the sleeve and the motion transmitting shaft.

13. An assembly as claimed in claim 1, wherein said end portion of the motion transmitting shaft which is engaged in the sleeve has a triangular cross-sectional shape.

14. An assembly as claimed in claim 1, wherein said end portion of the motion transmitting shaft which is engaged in the sleeve has the cross-sectional shape of a flat strip.

15. An assembly as claimed in claim 1, wherein the yoke branches have a bore for mounting a needle bearing cup which caps a corresponding trunnion of the cross member, the bores being formed exclusively in the thickness of the branches formed in the tubular element.

16. An assembly as claimed in claim 1, comprising on the motion transmitting shaft a radial lug, a corresponding opening in the end portion of the tubular element constituting a collar, the lug being engaged in the opening and the lug defining with a circumferential end of said opening such clearance that, in normal operation and for transmission of torques not exceeding said given torque, the lug remains out of contact with said end but comes in contact with said end when said given torque is exceeded and the elastomer of the sleeve is deformed beyond a predetermined limit.

17. An assembly as claimed in claim 16, wherein a plurality of said lugs and a plurality of said corresponding openings are provided.

18. An assembly as claimed in claim 16, wherein the radial lug constitutes one piece with a washer which is integral with the motion transmitting shaft.

19. An assembly as claimed in claim 18, wherein said washer is an interference fit on the motion transmitting shaft.

20. An assembly as claimed in claim 17, wherein the end portion of the tubular element opposed to the yoke branches has two circumferentially extending diametrally opposed notches which face in circumferentially opposite directions in which said lugs are engaged.

21. An assembly as claimed in claim 16, wherein the end portion of the tubular element opposed to the yoke branches has a circumferentially extending opening in which the radial lug is engaged.

22. An assembly as claimed in claim 17, wherein the end portion of the tubular element opposed to the yoke branches comprises two diametrally opposed circumferentially extending openings in which said lugs are engaged.

23. An assembly as claimed in claim 22, wherein the radial lugs constitute one piece with a circular washer which is integral with the motion transmitting shaft, the dimension of one of the openings transversely of the tubular element exceeding the diameter of the circular part of the washer and the corresponding lug extending over a wide angle.

24. A universal joint having two yokes each of which yokes is combined with a motion transmitting shaft and an assembly comprising a tubular element having one end portion so shaped as to define two branches of the yoke for mounting a cross member of the joint and recessed portions for accommodating angular movements of the joint, the tubular element having an opposite end portion which constitutes a collar, the motion transmitting shaft having an end portion disposed within the collar and a portion extending beyond the collar in a direction away from the yoke branches and means for elastically interconnecting the shaft and the collar for transmission of a given torque while precluding direct contact between the shaft and the yoke when transmitting said given torque, said means consisting of a sleeve of elastomeric material surrounding the motion transmitting shaft and radially compressed between and in direct contact with the collar and said end portion of the motion transmitting shaft.

25. An assembly comprising a rotary motion transmitting shaft having an axis of rotation; a universal joint yoke; the yoke comprising a tubular element having one end portion so shaped as to define two branches of the yoke for mounting a cross member of the joint and recessed portions for accommodating angular movements of the joint, the tubular element having an opposite end portion which constitutes a collar, the motion transmitting shaft having an end portion disposed within the collar and a portion extending beyond the collar in a direction away from the yoke branches; and means for elastically interconnecting the shaft and the collar axially and circumferentially for transmission of a given torque while precluding direct contact between the shaft and the yoke axially and radially of said axis of rotation of the shaft when transmitting said given torque, said means consisting of a sleeve of elastomeric material surrounding the motion transmitting shaft and radially compressed between and in direct contact with the collar and said end portion of the motion transmitting shaft.

* * * * *